Patented Mar. 13, 1951

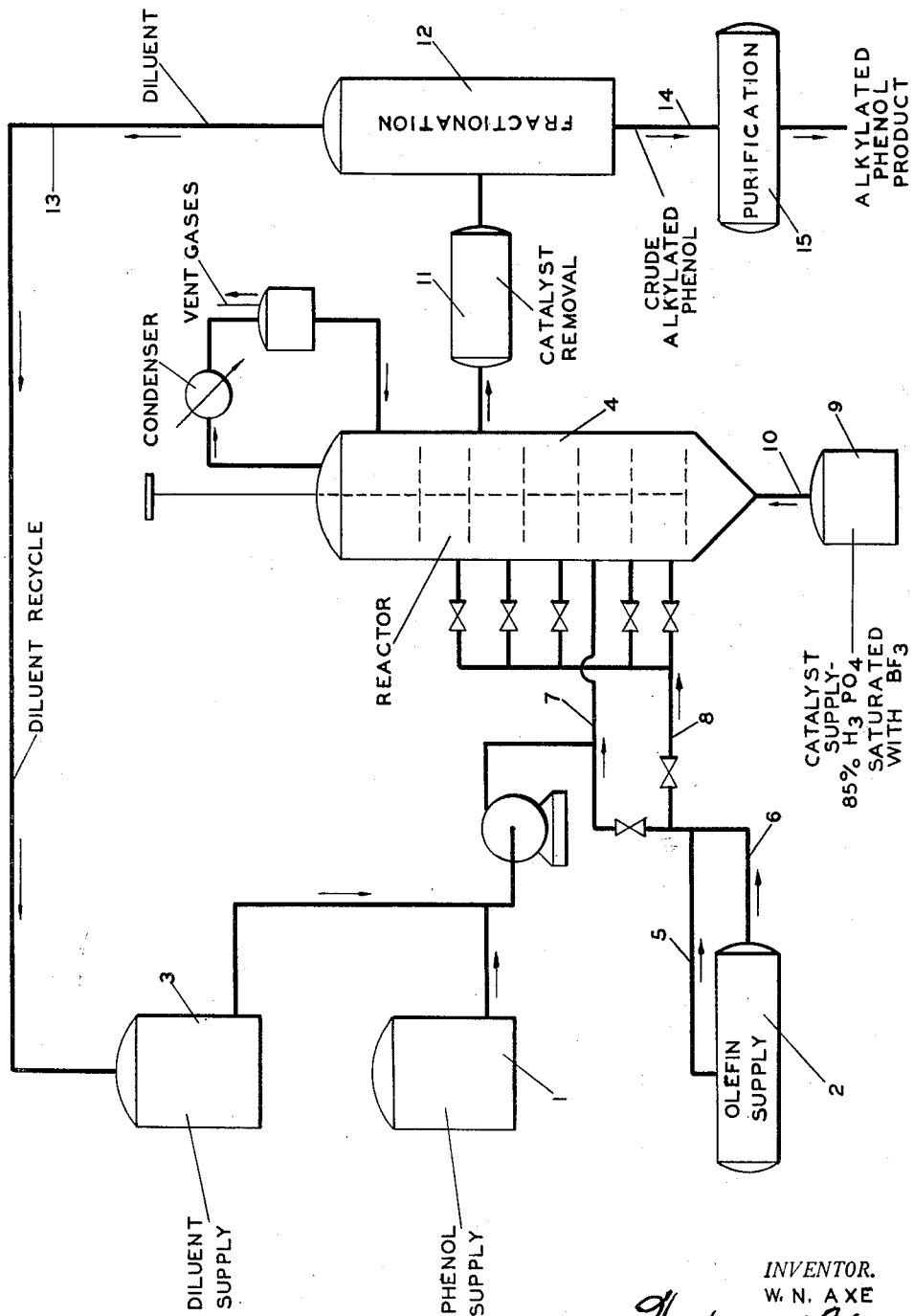

2,544,818

UNITED STATES PATENT OFFICE 2,544,818

ALKYLATION OF PHENOLS

William N. Axe, Bartlesville, Okla., assignor to Phillips Petroleum Company, a corporation of Delaware Application November 16, 1945, Serial No. 629,202

13 Claims. (Cl. 260—624)

This invention relates to the alkylation of phenols with olefins and more particularly to the alkylation of phenols with aliphatic olefins and cyclic olefins employing a catalyst comprising essentially an addition product of boron fluoride and phosphoric acid. Still more particularly it relates to the preparation of para-tertiary butyl phenol from isobutylene and phenol.

Alkylated phenols are of increasing commercial importance especially as chemical intermediates. They are of particular value as starting materials for the production of synthetic resins. Thus, they may be reacted with aldehydes or with other reactive chemicals to give resinous materials and tackifiers of great value. For example, a product made by the condensation of para-tertiary butyl phenol with acetylene has been found extremely valuable as a tackifier in synthetic rubber tires.

The principal object of the present invention is to provide an improved process for the alkylation of phenols with olefins. Another object is to provide such a process wherein aliphatic olefins especially low-boiling olefins having from 3 to 5 carbon atoms per molecule are employed. Another object is to provide such a process wherein cyclic olefins especially $C_5$ or $C_6$ olefins are used. Another object is to provide a process as set out above for the preparation of para-tertiary butyl phenol from phenol and isobutylene. Numerous other objects will hereinafter appear.

The accompanying drawing portrays diagrammatically one arrangement of equipment which may be employed in carrying out the process of the present invention.

The alkylation of phenols with alcohols, alkyl halides and olefins is old per se. It is further known and recognized that the benzene nucleus in phenolic compounds is very susceptible to alkylation in the presence of conventional alkylation catalysts such as sulfuric acid, aluminum chloride, zinc chloride, hydrogen fluoride and the like. However, this very ease of alkylation often is a disadvantage when the synthesis of specific mono-alkyl derivatives of phenols are desired. Further complications involved in phenol alkylation are attributed to the reactivity of the phenolic group toward alkylating agents giving rise to undesirable aralkyl ethers. Thus, in the alkylation of phenol and cresols with butyl alcohol, butylenes and so on, the art shows yields of monoalkyl derivatives seldom exceeding 50 mole per cent and more often in the neighborhood of 30–40 per cent with such catalysts as aluminum chloride and sulfuric acid. The balance of the products in such cases are aralkyl ethers and polysubstituted phenols. In certain well known processes utilizing strong sulfuric acid as the catalyst for the alkylation of cresols with isobutylene, the products are almost exclusively dibutylcresols.

The present invention is concerned with the production of alkylated phenols wherein only one aliphatic or cycloaliphatic residue is introduced into the benzene nucleus. Such products as isopropylphenol, tert-butylphenol, sec-butylphenol, cyclohexylphenol, mono-tert-butylcresol and tert-butylcatechol have been found to possess exceptional properties as antioxidants, resin intermediates and the like. I have found that the complex compounds derived from orthophosphoric acid and boron fluoride in most instances exert a specific catalytic activity with respect to phenolic materials whereby the introduction of a single hydrocarbon residue into the benzene nucleus is the predominating reaction.

The use of boron fluoride or, more precisely, the complex compound of boron fluoride and phenol in the alkylation of phenol with olefins and alcohols has been described by Nieuwland and his co-workers. The best yields reported with the propyl alcohols did not exceed 48 per cent of the theory with respect to monopropylphenols (J. A. C. S. 57, 709–11 (1935)). Furthermore, when alkylating with propylene using boron fluoride as the catalyst (J. A. C. S. 54, 3694 (1932)) it was found that the type of product obtained was largely dependent on the temperature of reaction. Thus, at 0° C. the products were mainly phenylpropyl ethers; at 20° C. a mixture of monoisopropyl phenol and the corresponding ether were obtained while at 40° C. (104° F.) the only products were polypropylated phenol ethers. This reliable work by an eminent investigator serves to point out the unusual characteristics of the boron fluoride-phosphoric acid liquid complex catalyst of the present invention, since under very similar reaction conditions, the present catalyst results in routine yields of monoisopropyl phenol amounting to 74 per cent of the theory at a temperature of about 97° F.

In accordance with the present invention alkylated phenols are prepared by contacting a phenol and an olefin in the presence of a catalyst comprising essentially the addition compound of boron fluoride and phosphoric acid under alkylation conditions whereby introduction of a single alkyl group corresponding to said olefin into the benzene nucleus of said phenol is the principal reaction. Preferably the catalyst consists of 70 to 90 per cent aqueous orthophosphoric acid saturated with boron fluoride.

The boron fluoride-ortho-phosphoric acid catalyst of this invention is prepared by adding gaseous boron fluoride to the acid or more preferably to concentrated aqueous solutions thereof. The resulting reaction is exothermic, and the rate of $BF_3$ addition is usually controlled, together with external cooling of the addition product, to avoid temperatures much above about 200° F. which may prolong the preparation. Saturation of the acid and completion of the preparation is denoted by escaping $BF_3$ fumes.

The exact mechanism of the addition reaction and/or the formulas of the compounds formed in the preparation of the catalyst are not always known, but it is fairly well established that two reactions occur. One is the formation of boron fluoride hydrate with any water present with the ortho-phosphoric acid; the other is the formation of an addition compound of boron fluoride and ortho-phosphoric acid containing approximately equimolecular proportions of each. For example, when using 85 per cent acid, the amount of boron fluoride absorbed corresponds to formation of the $BF_3 \cdot H_3PO_4$ addition compound plus sufficient boron fluoride to form a hydrate with 15 weight per cent of water present. At saturation under the above-mentioned conditions, this hydrate represents an $H_1O:BF_3$ mol ratio of slightly over 1:1.

The ortho-phosphoric acid employed may be the concentrated acid ranging from the 85 per cent acid of commercial grade up to about 100 per cent $H_3PO_4$. Or, aqueous solutions containing as little as 70 per cent $H_3PO_4$ may be employed. For most applications, 85 per cent phosphoric acid of commerce is preferred.

In this connection, it has been definitely established that the hydrate is not the principal active ingredient of the catalyst, although it may promote and/or cooperate in the activity of the $BF_3 \cdot H_3PO_4$ complex in some obscure fashion. Thus, boron fluoride hydrate to which phosphoric acid has been added (regardless of the proportions) is relatively inactive and does not exhibit the qualities of the catalyst prepared according to this invention. Similarly, when an active catalyst of my preferred composition loses appreciable quantities of boron fluoride during use, it becomes less active.

The addition of a slight excess of phosphoric acid to a normally active catalyst results in a condition approximating spent catalyst. On the other hand, addition of boron fluoride hydrate to an active catalyst does not materially impair its activity. From this evidence it may be deduced that decomposition of the phosphoric acid complex ($BF_3 \cdot H_3PO_4$) is the primary reaction controlling catalyst life, and this complex is therefore the essential ingredient of the catalyst composition.

As a consequence, my preferred catalysts do not reach maximum activity until the phosphoric acid solution is saturated with boron fluoride. Thus, it will be apparent that from the standpoint of both the catalyst cost and activity, it is more efficient to employ concentrated acid solutions to decrease the quantity of the boron fluoride consumed in hydrate formation. On the other hand, 95 to 100 per cent phosphoric acid is relatively expensive and tends to solidify at moderately low temperatures so that 70 to 90 per cent concentrations are often preferred. However, after addition of boron fluoride, the finished catalyst is a heavy liquid which shows no tendency to solidify at temperatures as low as —40° F.

As the olefin I may employ aliphatic olefins especially low-boiling olefins having from 3 to 5 carbon atoms per molecule, namely, propylene, normal butylenes, isobutylene, and any of the amylenes. I may also employ cyclic olefins especially those having five or six carbon atoms in the ring such as cyclopentene and cyclohexene and their alkyl derivatives.

The olefin may be pure or may be admixed with inert material, usually the normal paraffins, in which case such inert material merely functions as a diluent in the reaction zone. Where the inert material is propane, it passes through the reaction zone and appears in the gases which are uncondensed in the overhead condenser and are vented from the condensate accumulator. In the case of normal butane, it may or may not be thus removed from the reaction zone depending on the temperature and pressure conditions prevailing therein. Presence of such inert material in the olefin stream is desirable in many respects. Thus, it enables avoidance of the trouble and expense of concentrating the olefin to separate it from paraffin. Furthermore, it serves to reduce the local concentration of the olefin in the reaction zone. This latter effect is especially advantageous where the olefin is introduced in gaseous form to the reaction zone.

I prefer to carry out the process of the present invention in the presence of a large volume of normal paraffin hydrocarbon as a diluent. This serves to cut down side reactions and to moderate the reaction with consequent reduction of losses and increased yield of the desired material. It also serves as a solvent for the olefin and as a suspension medium for the phenol. It also serves to keep the temperature rise from being excessive. In addition the diluent enables very simple temperature control by holding the reaction mixture at the boiling point of the diluent and condensing and returning the volatilized diluent to the reaction zone. It is seldom feasible to effect such temperature control by volatilization of the olefin since ordinarily the process is carried out under such conditions that the olefin concentration is kept too low to permit this result.

The reaction may be carried out in any suitable way. The phenol and the olefin may be fed to the reaction zone separately or in admixture with one another. The phenol may be introduced in the liquid state where it is sufficiently low-melting, or especially where it is a solid at the reaction temperature it may be introduced as a dispersion in the diluent. Since the phenols have limited solubility in the normal paraffins used as diluent, they may be dispersed as either solid or liquid in the diluent, it being ordinarily not feasible to use such proportions of the phenol and the diluent to cause all of the phenol to be dissolved in the diluent phase. The olefin may be introduced over a long period of time in the case of a batch operation or continuously in a continuous-type operation.

Ordinarily the phenol is suspended in the diluent and the resulting suspension is commingled with the liquid boron fluoride-phosphoric acid and with the olefin in the reaction zone. The mixture is agitated in order to keep the several phases in intimate contact with each other for a period of time sufficiently extended to insure the completion of the desired reaction. The reaction zone is provided with any suitable cooling means such as the usual cooling jacket and/or cooling coils but more preferably a reflux condenser arrangement as described above.

It is preferred that the concentration of free or unreacted olefin in the reaction zone be kept at a suitably low level in order to prevent side reactions, especially polymerization. For example, the olefin concentration in the reaction zone may be kept below 5 weight per cent. In a continuous operation this may be accomplished by using an external feed mole ratio of from 2 to 6 moles of the phenol per mole of the olefin. Because of the consumption of olefin in the reaction zone the mole ratio of phenol to olefin therein may be as high as 100 to 1 or even higher. In a batch operation the desired low concentration of olefin is readily obtained by initially introducing the entire amount of the phenol into the reaction zone and adding the olefin gradually over a prolonged period of time, say one to three hours. An artificially high ratio of phenol to olefin may be maintained in the reaction zone in any suitable way, for example by recycling reaction mixture from a point at which olefin is substantially consumed to a point adjacent the point of inlet of fresh olefin, inside or outside of the reactor. Such an artificially high ratio may also be obtained by injecting the olefin in small streams at a multiplicity of points along the reaction zone. These expedients may be employed in addition to maintenance of the external mole feed ratio in excess of one, say at from 2 to 1 to 6 to 1 as described above.

The proportions of reactants, catalyst and diluent employed may be varied over wide limits without departing from the spirit of the invention. Ordinarily, I prefer to use from 200 to 1000 cc. of the normal $C_4$ to $C_8$ paraffin diluent per mole (gram molecular weight) of the phenol and to use the catalyst in amount ranging from 10 to 100 cc. per mole of the phenol. The total amount of olefin introduced to the reaction zone is often substantially equimolecular to the phenol but it may be considerably less than the equimolecular amount. In a continuous operation it may run as low as 10 per cent of the amount equimolecular to the phenol. In a batch operation as described in the examples it is convenient to use between about 90 and about 100 per cent of the stoichiometric amount of olefin. Use of a molar deficiency of olefin relative to phenol is often desirable, as explained above although when such a deficiency is employed the unreacted phenol must be separated from the reaction effluent to effect purification of the product alkylated phenol. Recovery and recycle of the unreacted phenol may impose an objectionable load on the recovery and recycle system where the amount of unreacted phenol is excessive but ordinarily this is not a serious objection to the use of a deficiency of olefin.

The reaction mixture is withdrawn from the reaction zone and is treated in any suitable way to recover the alkylated phenol product and the diluent and unreacted phenol. Catalyst is removed either by settling or by caustic and/or water washing or by a combination of these procedures after which the normal paraffin hydrocarbon diluent is removed by fractional distillation. If desired the residue may be treated with caustic solution to separate it into alkali-soluble and alkali-insoluble fractions. The alkali-soluble portion may contain the unreacted phenol acid product while the alkali-insoluble fraction may comprise any of the poly-alkylphenols such as the dialkylated phenols that may be formed in small quantities.

The unusual effectiveness of the present catalyst may be due to further complex compound formation between the catalyst composition and the phenolic intermediate. Thus, on contacting the catalyst with phenol in the presence of a diluent in the absence of olefin, a pronounced absorption of heat is observed as the phenol and catalyst phases combine. The nature of this reaction is unknown, but it is apparent that the alkylation actually occurs in the non-hydrocarbon phase.

In a general embodiment of this invention wherein a batch procedure is employed, the selected phenol is suspended in from about 200 to 1000 cc. of inert diluent such as n-pentane per mole of the phenol. Catalyst prepared as described above is added in amount equivalent to about 10 to 100 cc. per mole of the phenol charged and the mixture is thoroughly agitated while charging either gaseous or liquid olefin at such a rate as to provide moderate boiling of the diluent. A reflux condenser is provided to condense the diluent and return it to the reaction zone. Ordinarily no other means of temperature control is required. Upon addition of an equimolecular amount of olefin, the reaction is stopped and water is added to decompose and remove the catalyst. The diluent is then removed by distillation and the crude phenolic product is purified by distillation and/or recrystallization. In many instances a preliminary treatment with 10 per cent caustic solution may be employed to segregate alkali-soluble and alkali-insoluble products. All monoalkyl substitution products of phenol, cresols, xylenols, etc. are soluble in alkali while phenol ethers and certain polyalkylated products such as tri-tert-butylphenols are insoluble.

While batch reactions are often most convenient for the alkylation of phenolic materials, continuous processes are also contemplated.

Phenolic intermediates suitable for use in the present process include monohydric phenols such as phenol and its alkyl derivatives such as cresols, xylenols, etc. as well as dihydric phenols such as catechol, hydroquinone and resorcinol. Aside from alkyl derivatives it is preferred to use unsubstituted phenols.

The diluents of this invention are selected paraffinic hydrocarbons preferably normal $C_4$ to $C_8$ paraffins such as n-butane, n-pentane, n-hexane or fractions of natural gasoline free of alkylatable isoparaffins. Where a normally gaseous diluent such as normal butane is used the pressure must be maintained sufficiently high to hold it in liquid phase. Normal pentane is preferred because its boiling point gives a suitably low reaction temperature at atmospheric pressure.

Conditions of temperature and pressure may vary within considerable limits depending on the system under consideration. It is preferred to adjust the pressure in such a way that the boiling point of the normal paraffin hydrocarbon diluent is within the preferred operating temperature range; allowing the diluent to boil and condensing and returning the volatilized diluent is a most effective and convenient method of holding the desired temperature at a constant level. Ordinarily temperatures of from 50° F.

to about 150° F. are adequate with temperatures of about 85–120° F. being preferred. Pressures may vary from atmospheric to about 200 pounds per square inch gage or higher. In batch reactions low superatmospheric pressures are preferred. In continuous reactions, liquid phase contacting is preferred between the olefin and phenol; in such type of operation the pressure must, of course, be sufficiently great to hold the olefin in liquid phase. In batch reactions gaseous olefin may be added to the reaction zone.

In the drawing, a phenol from tank 1, olefin from tank 2 and diluent from tank 3 are fed into reactor 4 by the lines shown. The olefin fed in gaseous form via line 5 or in liquid phase via line 6 may be admixed with the suspension of phenol and diluent flowing in line 7 or may be separately introduced to reactor 4 via line 8 entering the reactor at a single point or at a multiplicity of points as shown. Reactor 4 is supplied with catalyst from tank 9 via line 10. Reactor 4 is provided with stirring means for attaining intimate admixture of phases. The vapors leaving the top of reactor 4 may be condensed and returned in the manner indicated, any uncondensed gases such as traces of $BF_3$ being vented as shown. The reaction mixture is passed to a catalyst removal unit 11. The resulting mixture which contains the alkylphenols and any unreacted phenol is passed to fractionation system 12 where the diluent is recovered for recycle via line 13. The mixture of phenols may then be passed via line 14 to purification unit 15 wherein the product alkylated phenol is recovered. Means (not shown) for recovering and recycling the unreacted phenol may be provided.

Example 1

Three moles of phenol and 750 cc. of n-pentane were charged to a 2-liter glass reactor equipped with a motor-driven stirrer. To the agitated suspension of phenol and pentane there was added 50 cc. of catalyst comprising syrupy phosphoric acid saturated with boron fluoride. A drop in temperature of 12° F. was observed at this point due to solution or reaction between the phenol and the boron fluoride-phosphoric acid complex. The introduction of gaseous isobutylene into the reaction mixture resulted in an evolution of heat, raising the temperature to the boiling point of the pentane diluent. The alkylation reaction was discontinued after the addition of 2.7 moles of isobutylene and the pentane solution was washed with caustic solution followed by water. Upon removal of the pentane diluent by distillation, a low-melting solid was obtained which was recrystallized from n-pentane at the temperature of an ice-salt bath. The melting point of the crystalline product was 97.5–98.5° C. (uncor.). This product is completely soluble in aqueous alkali and its melting point corresponds to that of p-tert-butylphenol. The yield of pure recrystallized product amounted to 80 per cent of theory based on isobutylene charged.

Example 2

One mole of catechol and 1000 cc. of n-pentane were charged to the reactor of Example 1. With efficient stirring, 100 cc. of catalyst consisting of 85 per cent phosphoric acid saturated with boron fluoride was added to the suspension. One mole of isobutylene in the gaseous phase was then added to the suspension over a period of about one hour. The catalyst, catechol and alkylate are substantially insoluble in pentane; hence, the diluent serves only as a solvent for the isobutylene and a means of maintaining the temperature of reaction below 97° F. After the addition of the isobutylene, the pentane was mechanically separated from the reaction phase. The catalyst was removed from the heavy oil by water extraction, after which the oil was dissolved in 10 per cent sodium hydroxide solution. No alkali insoluble material was obtained; hence, the product was recovered by neutralization. The recovered oil was distilled at 3 mm. pressure, the entire product distilling between 140–160° C. The distillate crystallized at room temperature and final purification was effected by recrystallization from isooctane. The purified material melted at 54–55° C. (uncor.) and was found by conventional tests to be identical with an authentic sample of 1,2-dihydroxy-3-tert-butylbenzene. The yield of tert-butyl catechol was about 70 per cent of the theory based on catechol charged.

Example 3

Three moles of phenol and 700 cc. of n-pentane were charged to the 2-liter reactor of Example 1. On addition of 50 cc. (92 g.) of catalyst, prepared by saturating 85 per cent phosphoric acid with boron fluoride, a pronounced absorption of heat occurred as the phenol and catalyst phases united to form a single phase mechanically separable from the pentane diluent. Three moles of gaseous propylene was added to the reaction mixture over a period of 1.5 hours at a reaction temperature range of 95–96° F. The resulting hydrocarbon solution of alkylated phenol was washed with water prior to removal of the pentane by distillation. The depentanized product was then treated with 10 per cent sodium hydroxide solution to separate the alkylate into alkali-soluble and alkali-insoluble fractions. The alkali-soluble material was fractionally distilled at atmospheric pressure to give an overhead product of ortho- and para-isopropylphenol boiling at 199–230° C. (uncor.). The yield of isopropylphenol amounted to 74 per cent of the theory based on phenol.

Example 4

Three moles of m-cresol (325 g.) and 750 cc. of n-pentane were charged to the 2-liter glass reactor. Catalyst (50 cc.) consisting of 85 per cent phosphoric acid saturated with boron fluoride was added to the cresol solution and mechanical agitation was employed to mix the two phases during the addition of 3 moles of gaseous isobutylene. The reaction mixture was washed with water to remove the catalyst after which pentane and m-cresol were recovered by distillation at atmospheric pressure. Mono-tert-butylcresol was separated from higher alkylation products by treatment of the total product with 10 per cent sodium hydroxide. The yield of tertiarybutylcresol was found to be 62 per cent of the theory based on cresol consumed. Material balance values indicated that the alkali insoluble material contained 2 butyl groups per mol of cresol.

Example 5

The procedure of Example 4 was employed to alkylate p-cresol with isobutylene. In this instance 133 g. of cresol was recovered unreacted indicating the reaction of 2 moles of isobutylene per mole of p-cresol. The reaction product was substantially insoluble in 10 per cent sodium hydroxide which is characteristic of the di-tert-butylcresols.

Example 6

Three moles of phenol (284 g.) were suspended in 100 cc. of n-pentane and charged to the 2-liter glass reactor. While mechanically agitating the phenol-pentane mixture, 50 cc. of boron fluoride-phosphoric acid catalyst was added and heat absorption was noted. Three moles of cyclohexene in 300 cc. of n-pentane was added to the system over a period of 4 hours while maintaining the temperature below about 97° F. The pentane solution of product was washed with water to destroy the catalyst and the pentane was recovered by distillation. A separation of crude product into alkali-soluble and alkali-insoluble material was effected with 10 per cent sodium hydroxide. The alkali-soluble material was separated into ortho- and para-cyclohexylphenol by virtue of the relative insolubility of the para isomer in cold n-pentane. Both of the isomers were recrystallized from isooctane and were identified by melting point determinations. The yield of mono-cyclohexylphenols was 50 per cent of theory based on phenol charged or 66 per cent based on phenol reacted. The alkali-insoluble material is presumed to be di-cyclohexylphenol.

As used herein and in the claims the term "a phenol" is used in its normal sense to designate any compound having at least one hydroxyl group attached directly to the benzene ring, while the term "phenol" denotes the single compound $C_6H_5OH$ also known as carbolic acid.

I claim:

1. The process of introducing a single alkyl group into a phenol which comprises contacting a phenol and an olefin in the presence of normal pentane as a diluent and in the presence of a catalyst consisting of the product resulting from the saturation of concentrated aqueous orthophosphoric acid containing from 70 to 90% $H_3PO_4$ with boron fluoride, maintaining the resulting mixture at a temperature of from 85 to 120° F. at a pressure allowing boiling of the reaction mixture, while maintaining the olefin concentration below 5 weight per cent in the reaction mixture and thereby effecting introduction of a single alkyl group corresponding to said olefin into the benzene nucleus of said phenol as the principal reaction, and recovering the resulting product containing one introduced alkyl group in an amount in excess of 50 per cent of the theoretical yield.

2. The continuous process of introducing a single alkyl group into a phenol which comprises continuously introducing to a reaction zone a phenol, an olefin and a normal paraffin hydrocarbon diluent having from four to eight carbon atoms per molecule, the molecular proportions of said phenol and said olefin introduced to said zone being such as to give an external mole ratio of from 2 to 6 moles of phenol per mole of olefin, continuously maintaining in said zone a catalyst consisting of the product resulting from the saturation of concentrated aqueous orthophosphoric acid containing from 70 to 90% $H_3PO_4$ with boron fluoride, maintaining said reaction zone at a temperature of from 85 to 120° F. by boiling the same and thereby volatilizing said diluent, condensing the volatilized diluent and returning the liquid condensate to the reaction zone, thereby effecting introduction of a single alkyl group corresponding to said olefin into the benzene nucleus of said phenol as the principal reaction, continuously withdrawing the reaction mixture from the reaction zone and recovering therefrom the alkylated phenol containing one introduced alkyl group so produced in an amount in excess of 50 per cent of the theoretical yield.

3. The process of making para-tertiary butylphenol which comprises contacting phenol and isobutylene at a reaction temperature of from 85 to 120° F. in the presence of a catalyst consisting of the product prepared by saturating concentrated aqueous orthophosphoric acid containing from 70 to 90% $H_3PO_4$ with boron fluoride, and in the presence of boiling normal pentane diluent, while maintaining the isobutylene concentration below 5 weight per cent in the reaction mixture and thereby effecting alkylation of the phenol with the isobutylene to form para-tertiary butylphenol as the principal reaction product, and recovering the said para-tertiary butylphenol in an amount in excess of 50 per cent of the theoretical yield.

4. The process of making isopropylphenol which comprises contacting phenol and propylene at a reaction temperature of from 85 to 120° F. in the presence of a catalyst consisting of the product prepared by saturating concentrated aqueous orthophosphoric acid containing from 70 to 90% $H_3PO_4$ with boron fluoride, and in the presence of boiling normal pentane diluent, while maintaining the propylene concentration below 5 weight per cent in the reaction mixture and thereby effecting alkylation of the phenol with the propylene to form isopropylphenol as the principal reaction product, and recovering said isopropylphenol in an amount in excess of 50 per cent of the theoretical yield.

5. The process of making tertiary butylcresol which comprises contacting m-cresol and isobutylene at a reaction temperature of from 85 to 120° F. in the presence of a catalyst consisting of the product prepared by saturating concentrated aqueous orthophosphoric acid containing from 70 to 90% $H_3PO_4$ with boron fluoride, and in the presence of boiling normal pentane diluent, while maintaining the isobutylene concentration below 5 weight per cent in the reaction mixture and thereby effecting alkylation of the cresol with the isobutylene to form tertiary butyl cresol as the principal reaction product, and recovering said tertiary butyl cresol in an amount in excess of 50 per cent of the theoretical yield.

6. The process of making para-tertiary butylphenol which comprises admixing with a suspension of phenol in normal pentane as a diluent a catalyst prepared by saturating 85 per cent orthophosphoric acid with boron fluoride and adding isobutylene to the resulting mixture over a prolonged period of time so as to maintain the isobutylene concentration below 5 weight per cent in the reaction mixture, holding the resulting mixture at the boiling point and at substantially atmospheric pressure and condensing and returning the volatilized normal pentane to the reaction mixture during said addition of isobutylene and thereby maintaining the reaction temperature substantially at the boiling point of normal pentane, the proportions of said materials being such that there is present between 200 and 1000 cc. of normal pentane and between 10 and 100 cc. of said catalyst per mole of phenol and that the total amount of said isobutylene is between about 90 and about 100 per cent of that equimolecular to said phenol, and recovering para-tertiary butylphenol in an amount in excess of 50 per cent of the theoretical yield.

7. The process of introducing a single alkyl group into a phenol which comprises contacting a phenol and an olefin with a catalyst the essential catalytic ingredient of which is the addition compound of $BF_3$ and $H_3PO_4$ in approximately equimolecular proportions in the presence of a normal paraffin hydrocarbon diluent having from four to eight carbon atoms per molecule, maintaining the reaction mixture at a temperature of from 85 to 120° F. by boiling the same and thereby volatilizing said hydrocarbon diluent, condensing the volatilized hydrocarbon diluent and returning the resulting liquid condensate to the reaction zone, while maintaining the olefin concentration below 5 weight per cent in the reaction mixture and thereby effecting introduction of a single alkyl group corresponding to said olefin into the benzene nucleus of said phenol as the principal reaction, and recovering the resulting product containing one introduced alkyl group in an amount in excess of 50 per cent of the theoretical yield.

8. The process of introducing a single alkyl group into a phenol which comprises contacting a phenol and an olefin with a catalyst the essential catalytic ingredient of which is the addition compound of $BF_3$ and $H_3PO_4$ in approximately equimolecular proportions in the presence of normal pentane as a diluent, maintaining the reaction mixture at a temperature lying within the range of from 85 to 120° F. by boiling the same and thereby volatilizing said normal pentane, condensing the volatilized normal pentane and returning the resulting liquid condensate to the reaction zone, while maintaining the olefin concentration below 5 weight per cent in the reaction zone and thereby effecting introduction of a single alkyl group corresponding to said olefin into the benzene nucleus of said phenol as the principal reaction, and recovering the resulting product containing one introduced alkyl group in an amount in excess of 50 per cent of the theoretical yield.

9. The process of introducing a single alkyl group into a phenol which comprises contacting a phenol and an olefin with a catalyst consisting of the product resulting from the saturation of orthophosphoric acid of at least 70 per cent concentration with boron fluoride, said catalyst being employed in an amount ranging from 10 to 100 cc. per gram molecular weight of said phenol, in the presence of normal pentane as a diluent, said normal pentane being employed in an amount ranging from 200 to 1000 cc. per gram molecular weight of said phenol, maintaining the reaction mixture at a temperature within the range of from 85 to 120° F. by boiling the same and thereby volatilizing said normal pentane, condensing the volatilized normal pentane and returning the resulting liquid condensate to the reaction zone, while maintaining the olefin concentration below 5 weight per cent in the reaction zone and thereby effecting introduction of a single alkyl group corresponding to said olefin into the benzene nucleus of said phenol as the principal reaction, and recovering the resulting product containing one introduced alkyl group in an amount in excess of 50 per cent of the theoretical yield.

10. The process of claim 7 wherein tertiary butylcatechol is made by alkylating catechol with isobutylene.

11. The process of claim 7 wherein cyclohexylphenol is made by alkylating phenol with cyclohexene.

12. The process of claim 7 wherein said olefin is selected from the group consisting of propylene, the butylenes, the amylenes, cyclopentene, cyclohexene, and the alkyl derivatives of cyclopentene and cyclohexene.

13. The process of claim 12 wherein phenol is alkylated.

WILLIAM N. AXE.

REFERENCES CITED

The following references are of record in the file of this patent:

UNITED STATES PATENTS

| Number | Name | Date |
|---|---|---|
| 2,008,032 | Niederl | July 16, 1935 |
| 2,146,667 | Atwell | Feb. 7, 1939 |
| 2,192,015 | Nieuwland | Feb. 27, 1940 |
| 2,240,583 | Sparks et al. | May 6, 1941 |
| 2,283,465 | Schaad | May 19, 1942 |
| 2,351,347 | Luten | June 13, 1944 |
| 2,370,810 | Morrell et al. | Mar. 6, 1945 |

FOREIGN PATENTS

| Number | Country | Date |
|---|---|---|
| 451,359 | Great Britain | Aug. 4, 1936 |
| 453,422 | Great Britain | Sept. 4, 1936 |